United States Patent
Robbin

(10) Patent No.: US 11,235,825 B2
(45) Date of Patent: Feb. 1, 2022

(54) AREA STORAGE AND METHOD FOR CONVEYING VEHICLE BODIES OR VEHICLE BODY RECEPTACLES

(71) Applicant: EISENMANN SE, Böblingen (DE)

(72) Inventor: Jörg Robbin, Ammerbuch (DE)

(73) Assignee: EISENMANN SE, Böblingen (DE)

( * ) Notice: Subject to any disclaimer, the term of this patent is extended or adjusted under 35 U.S.C. 154(b) by 0 days.

(21) Appl. No.: 16/636,972

(22) PCT Filed: Jul. 27, 2018

(86) PCT No.: PCT/EP2018/070516
§ 371 (c)(1),
(2) Date: Feb. 6, 2020

(87) PCT Pub. No.: WO2019/030026
PCT Pub. Date: Feb. 14, 2019

(65) Prior Publication Data
US 2020/0164937 A1    May 28, 2020

(30) Foreign Application Priority Data
Aug. 7, 2017    (DE) .................... 10 2017 117 908.9

(51) Int. Cl.
*B62D 65/18*    (2006.01)
*B65G 1/10*    (2006.01)
*B65G 17/00*    (2006.01)

(52) U.S. Cl.
CPC .............. *B62D 65/18* (2013.01); *B65G 1/10* (2013.01); *B65G 17/005* (2013.01)

(58) Field of Classification Search
CPC .......... B65G 1/10; B65G 17/00; B65G 17/02; B62D 65/18

(Continued)

(56) References Cited

U.S. PATENT DOCUMENTS 4,712,483 A * 12/1987 Woodhall ............... B62D 65/18
                                                        104/48
4,874,280 A * 10/1989 Gamberini ................ E04H 6/24
                                                        414/234

(Continued)

FOREIGN PATENT DOCUMENTS

DE    10 2015 103 642 A1    8/2016
DE    20 2016 102 149 U1    7/2017

(Continued)

OTHER PUBLICATIONS

Youtube: Ray bei AUDI, https://www.youtube.com/watch?v=CRhoKyJmkCQ.

*Primary Examiner* — Douglas A Hess
(74) *Attorney, Agent, or Firm* — Schroeder Intellectual Property Law Group, LLC

(57) ABSTRACT

An area storage for storing vehicle bodies, the longitudinal extension of which equals at least one and a half times the transverse extension thereof, having a storage area having at least two storage spaces and two associated vehicle body receptacles, wherein the storage area is designed such that vehicle bodies can be stored on the storage area in a plane on the at least two storage spaces on one of the vehicle body receptacles in each case, at least one multi-track industrial vehicle, which can be coupled to the vehicle body receptacle. The industrial vehicle is designed for omnidirectional travel, such that the direction of conveyance can be chosen independently of the orientation of the industrial vehicle and the industrial vehicle having the coupled vehicle body receptacle can carry out a conveyance direction change without changing the relative orientation of the vehicle body receptacle and industrial vehicle. A method for conveying vehicle body receptacles is also disclosed.

13 Claims, 15 Drawing Sheets

(58) Field of Classification Search
  USPC .................................... 198/463.1; 414/234
  See application file for complete search history.

(56) References Cited

U.S. PATENT DOCUMENTS

| | | | | |
|---|---|---|---|---|
| 5,013,203 | A * | 5/1991 | Wakabayashi | B61J 1/10 |
| | | | | 104/35 |
| 5,863,171 | A * | 1/1999 | Engman | E04H 6/183 |
| | | | | 414/256 |
| 5,961,270 | A * | 10/1999 | Ortega | E04H 6/245 |
| | | | | 414/234 |
| 7,819,612 | B2 * | 10/2010 | Huang | E04H 6/24 |
| | | | | 410/4 |
| 8,613,582 | B2 * | 12/2013 | Shani | E04H 6/22 |
| | | | | 414/240 |
| 8,943,980 | B2 * | 2/2015 | Moberg | B65D 19/44 |
| | | | | 108/57.15 |
| 9,315,322 | B1 * | 4/2016 | Majied | B65G 65/005 |
| 9,631,390 | B2 * | 4/2017 | Segal | B65G 1/06 |
| 10,062,283 | B2 * | 8/2018 | Mielenz | G08G 1/14 |
| 2005/0042062 | A1 | 2/2005 | Krusche | |
| 2011/0005902 | A1 | 1/2011 | Kobs et al. | |
| 2019/0127000 | A1 | 5/2019 | Eberl | |
| 2020/0130115 | A1 * | 4/2020 | Vetter et al. | |

FOREIGN PATENT DOCUMENTS

| | | |
|---|---|---|
| DE | 10 2017 000 640 A1 | 7/2018 |
| EP | 2 746 193 A1 | 6/2014 |
| GB | 2 341 375 A | 3/2000 |

\* cited by examiner

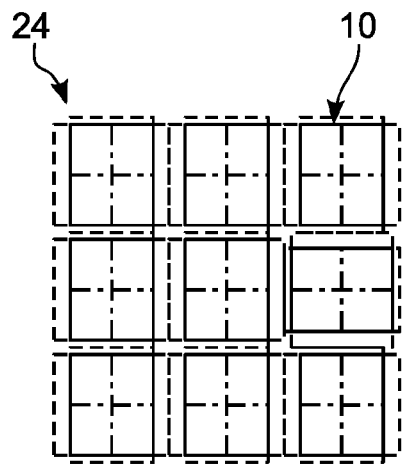 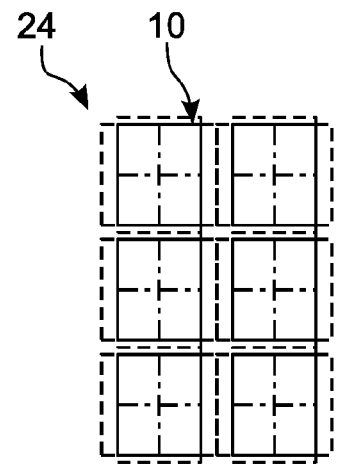
Fig. 4   Fig. 5
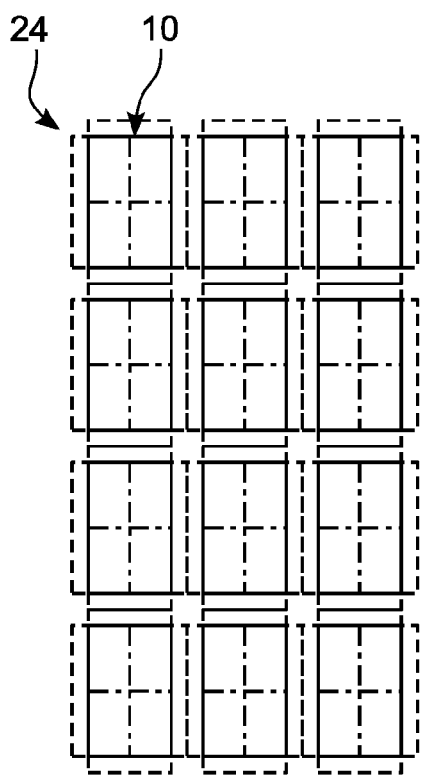 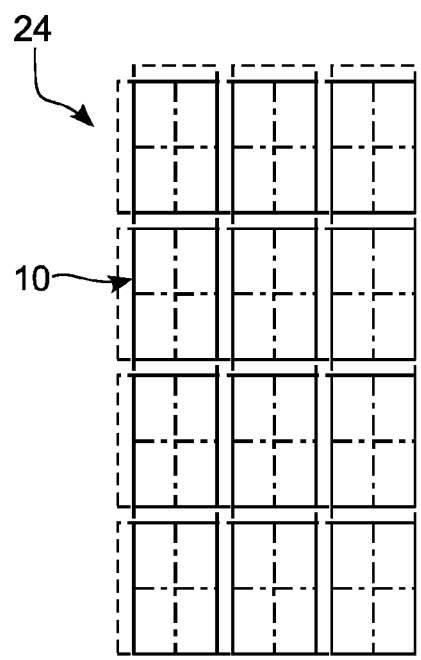
Fig. 6   Fig. 7

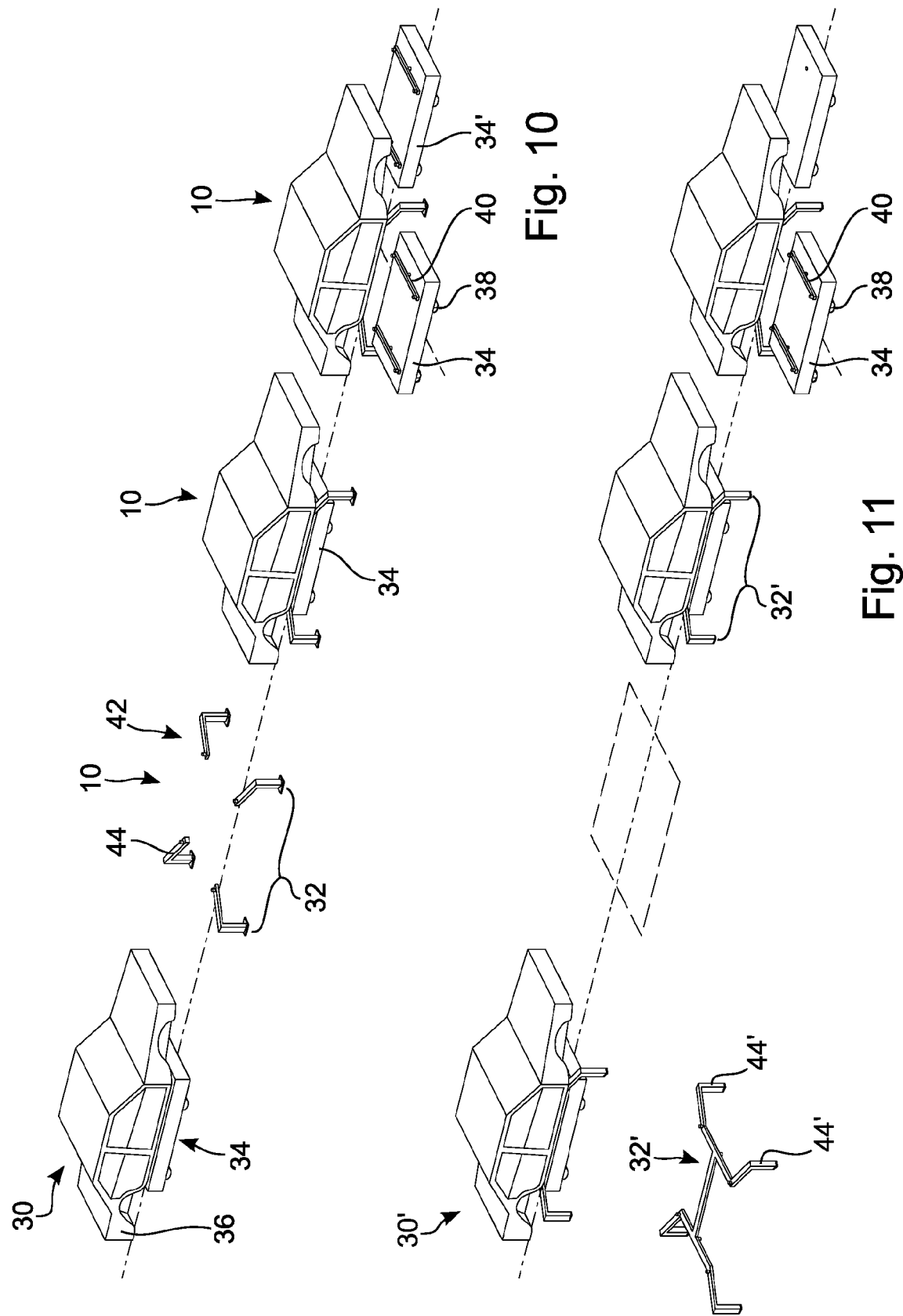

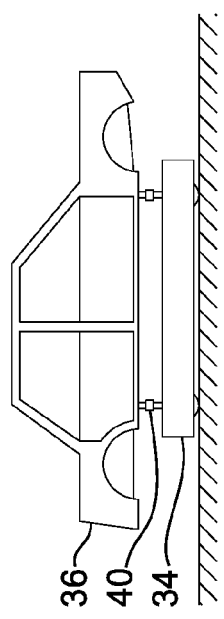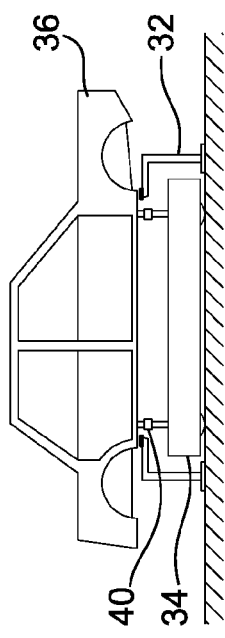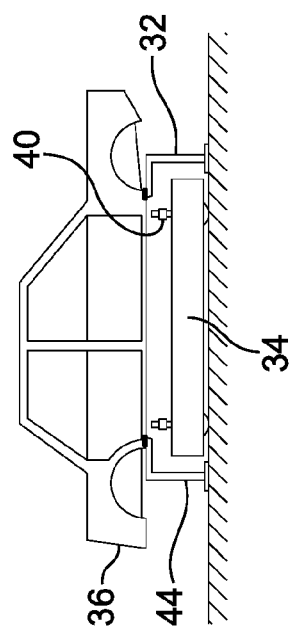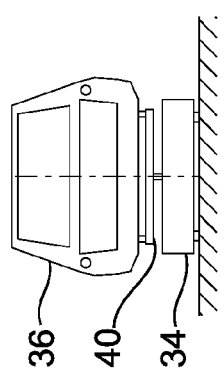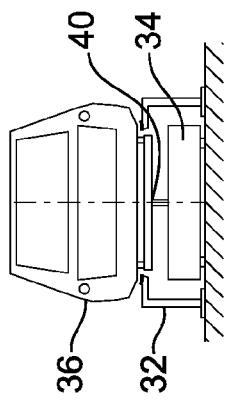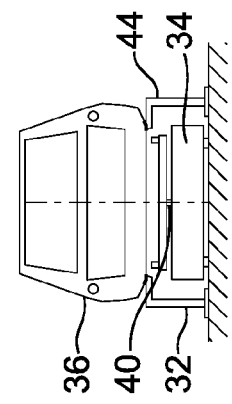

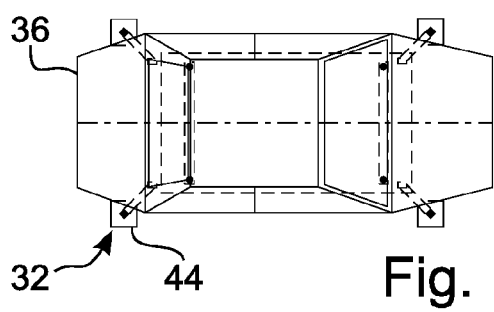
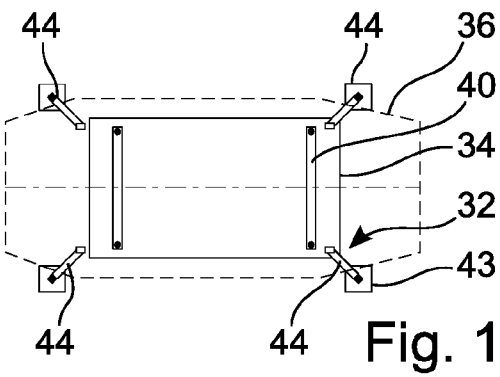
Fig. 18    Fig. 19
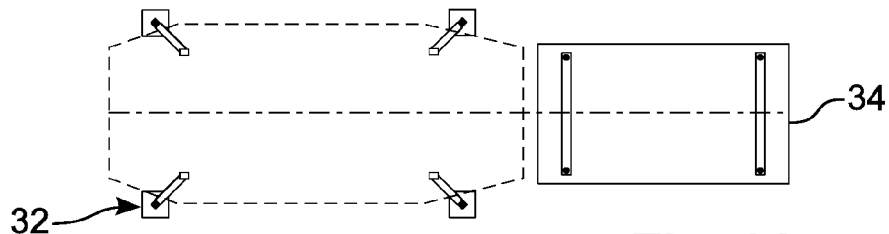
Fig. 20
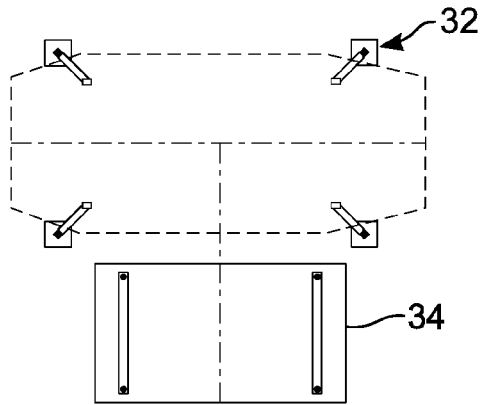
Fig. 21
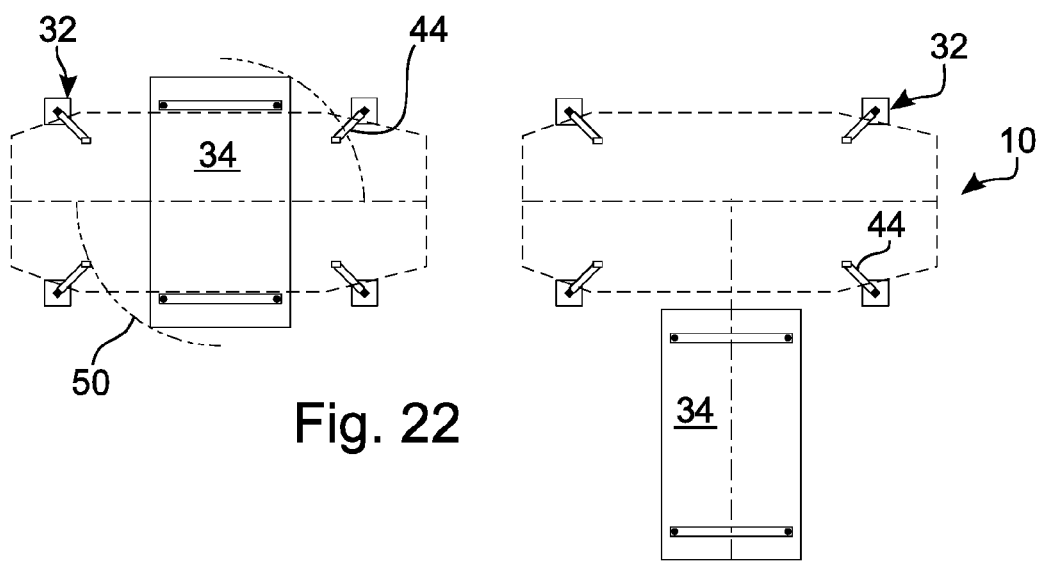
Fig. 22
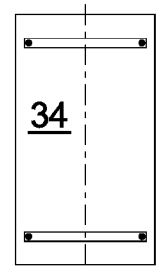
Fig. 23

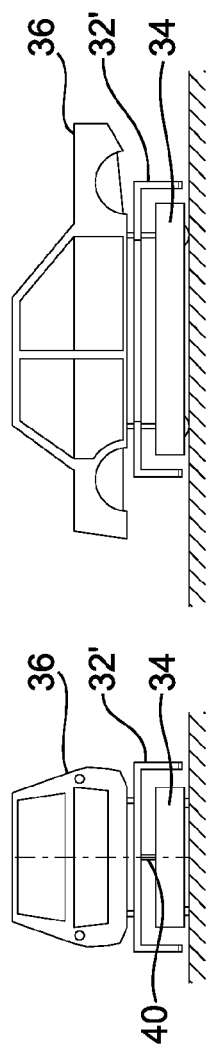
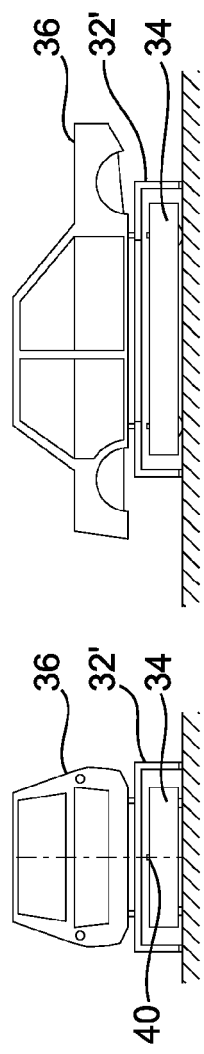
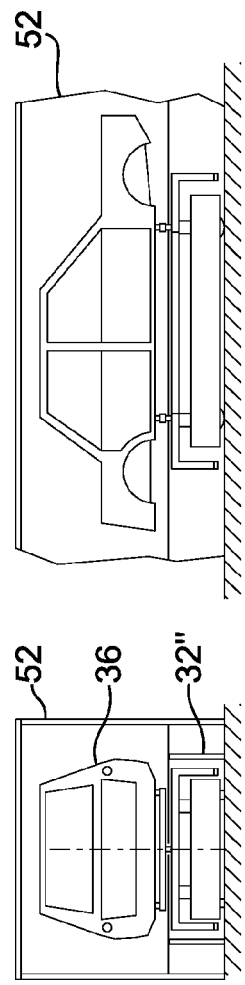
Fig. 24
Fig. 25
Fig. 26

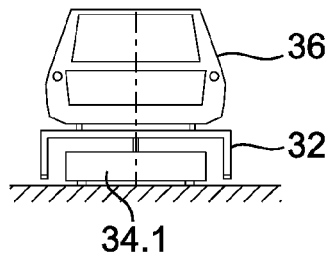 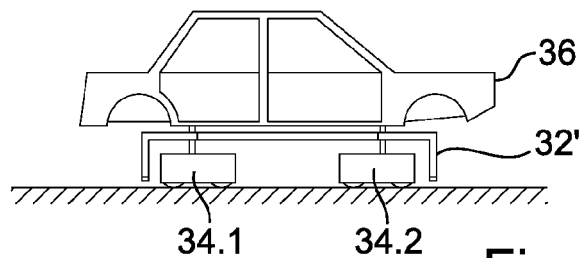
Fig. 37
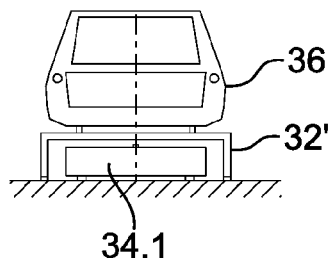 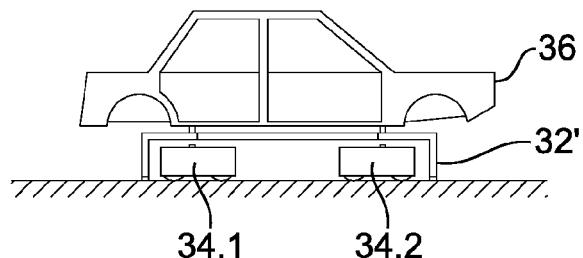
Fig. 38
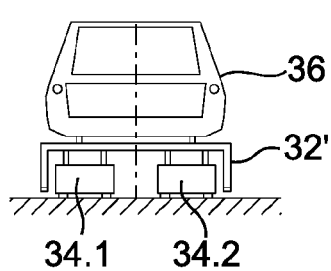 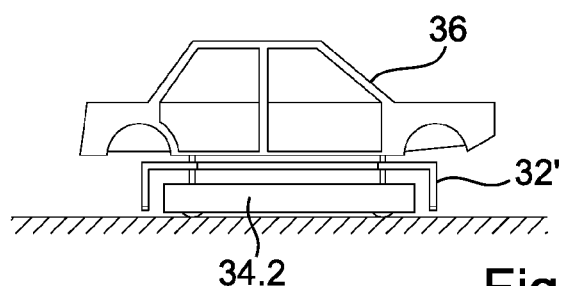
Fig. 39
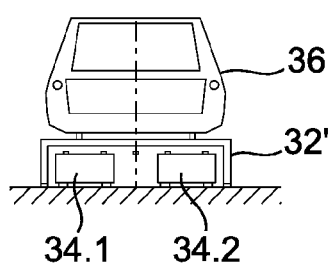 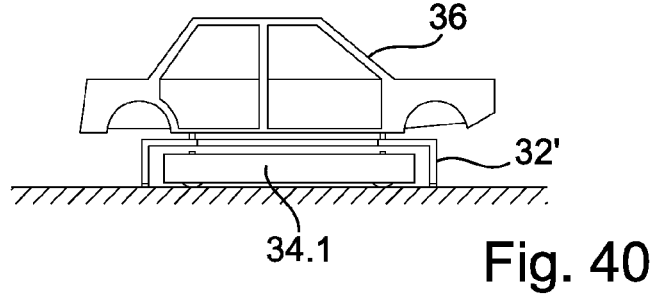
Fig. 40

AREA STORAGE AND METHOD FOR CONVEYING VEHICLE BODIES OR VEHICLE BODY RECEPTACLES

RELATED APPLICATIONS

This application is a national phase of International Patent Application No. PCT/EP2018/070516 filed Jul. 27, 2018, which claims priority to German Patent Application No. 10 2017 117 908.9 filed Aug. 7, 2017 the contents of both of which are incorporated herein by reference.

BACKGROUND OF THE INVENTION

1. Field of the Invention

The invention relates to an area storage for storing vehicle bodies whose longitudinal extension is at least one and a half times the transverse extension, wherein the area storage comprises a storage area with at least two storage places and two associated vehicle body mounts, wherein the storage area is configured such that vehicle bodies can be stored on the storage area in one level on the at least two storage places on one of the vehicle body mounts in each case, and at least one multi-track floor conveyor vehicle which can be coupled to a vehicle body and/or the vehicle body mount.

2. Description of Prior Art

In the field of automobile production, it is useful in the series production of automotive vehicles to provide buffer storage for the vehicle bodies between different processes such as between body-in-white and painting, between painting and final assembly or generally for sequence forming of subsequent production steps. For this purpose, a high-rise shelving with shelving operating devices is usually provided today as a buffer between individual process steps and production areas. Although such high-rise shelvings require a small base area, they are in turn expensive to manufacture and operate. A cost-intensive steel structure must be erected, which is equipped with extensive fire protection measures and, if necessary, even with workpiece protection devices. Such a high-rise shelving offers the advantage that the stored vehicle bodies can be removed in any sequence by one or two shelving operating devices per aisle. Since the shelving operating devices for vehicle bodies in such a high-rise shelving are expensive to manufacture and operate, the number of shelving operating devices is kept low. Accordingly, relocations within the high-rise shelving are difficult to perform and are usually avoided. The high-rise shelving requires a transfer device for the delivery and removal of the vehicle bodies, wherein the transfer device forms an interface between the conveyor system on the plain and the shelving operating device. Buffer places within the high-rise shelving in the sense of free storage places must be provided during the planning and construction of the building and are always present, even if they are not currently required. The storage places cannot be used for other purposes in the meantime. Accordingly, the total storage capacity of the high-rise shelving must be designed for the maximum planned size.

Such a high-rise shelving for a motor vehicle production can, for example, have six shelving operating devices which are coupled with, for example, 120 drives in the pre-zone of the high-rise shelving for transferring the vehicle bodies. In order to realize a sequence storage with max. 1000 storage places with such a high-rise shelving, another 150 drives are necessary, resulting in a total of 270 drives with usually 12 different drive types.

Alternatively, so-called storage track are known, which line up the vehicle bodies in one direction of movement according to the FIFO principle. A storage track requires a correspondingly large amount of base area, but only simple fire protection and a less complex substructure. Correspondingly, many handling devices must be provided to move the vehicle bodies within the storage track. Here, too, the buffer storage for the maximum size must be configured for the maximum size from the outset and empty storage places cannot be used for other purposes temporarily.

SUMMARY OF THE INVENTION

It is an object of the invention to provide a buffer storage for vehicle bodies of the type mentioned above, which can be realized with low investments regarding fire protection or safety technology and at the same time enables a dynamic allocation of storage places for vehicle bodies.

This object is solved by an area storage for storing vehicle bodies whose longitudinal extension is at least one and a half times the transverse extension. The area storage according to the invention comprises a storage area with at least two storage places and two associated vehicle body mounts. The vehicle body mounts are configured such that they can each receive at least one vehicle body, so that a storage place is occupied when a vehicle body mount with a vehicle body coupled thereto is arranged there. The storage area of the area storage is configured such that vehicle bodies can be stored on the storage area in one level on the at least two storage places on one of the vehicle body mounts in each case. The area storage comprises at least one multi-track floor conveyor vehicle which can be coupled to a vehicle body and/or the vehicle body mount.

According to the invention, it is provided that floor conveyor vehicle is configured for omnidirectional travel such that the direction of conveyance can be selected independently of the orientation of the floor conveyor vehicle and in the case of the floor conveyor vehicle with the coupled vehicle body or/and vehicle body mount, a change in the direction of conveyance can be performed without a change in the relative orientation of vehicle body and/or vehicle body mount and floor conveyor vehicle.

The invention at hand relates to vehicle bodies with ratios of longitudinal extension to transverse extension greater than 1:1.5, i.e., for example, 1:1.5 to 1:1.9 as found, for example, in the vehicle class of compact cars, 1:1.9 to 1:2.6 as found, for example, in medium-sized cars and 1:2.6 to 1:3.2 as found in luxury cars. The dimensions of the floor conveyor vehicle can substantially correspond to the dimensions of the vehicle body to be transported and further ancillary conditions such as the required flexibility of the entire storage facility.

The coupling of the floor conveyor vehicle with the vehicle body or/and vehicle body mount can be realized in different ways. For example, the vehicle body and/or vehicle body mount can be placed on the floor conveyor vehicle. Alternatively, other mechanical, electrical and magnetic coupling can be used.

The term vehicle body mount can be understood to mean, for example, a mobile or stationary vehicle body mount such as a transport rack, a storage rack and/or a so-called skid.

The term floor conveyor vehicle is used here primarily to refer to an automated guided vehicle that moves around area-wise—in contrast to a shelving operating device. In doing so, height differences can also be overcome via ramps or lifts. The floor conveyor vehicle can be configured as an autonomously moving vehicle or as a remote-controlled vehicle.

The term omnidirectional driving is here to be understand in that the direction of conveyance can be selected independently of the orientation of the floor conveyor vehicle. For example, the floor conveyor vehicle can be oriented in a north-south direction, but select a direction of conveyance in an east-west orientation. This also has the consequence that the floor conveyor vehicle with the coupled vehicle body mount can maintain the orientation of the floor conveyor vehicle and thus also the orientation of the vehicle body mount, for example, in a north-south direction, but at the same time convey in an east-west direction.

A storage place indicates the location and the corresponding space required for a vehicle body mount with an associated vehicle body. Depending on the configuration of the floor conveyor vehicle and the intended directions of conveyance and functions, a function supplement varying in size can be assigned to an individual storage place, which takes into account the distance to be maintained to adjacent storage places, e.g. for turning movements or change-of-direction movements, based on the dimensions of the vehicle body.

The storage area is the total area taken up by the storage places which can be occupied. The storage area can be a coherent one-piece storage area segment or be composed of individual storage area segments, wherein the storage area segments can abut each other or can be arranged at a distance from each other and on different levels. The individual storage area segments can be functionally identical or can be intended for different functions such as buffering, sequencing, cooling, etc.

In combination with vehicle bodies whose longitudinal extension is at least one and a half times the transverse extension, omnidirectional driving or conveying respectively is particularly advantageous. In this way, it is possible to arrange the vehicle bodies on a comparatively large base area compared to the base area of a high-rise shelving, however the arrangement of the vehicle bodies is variable in many respects. For example, the entire storage area or parts of it can be easily relocated. The storage areas can be approached from any direction by means of the omnidirectional conveying possibility. Thus it is possible, for example, to convey a vehicle body with the associated vehicle body mount in the longitudinal direction of the vehicle body or to convey it on longer conveying paths. This has the advantage that the width of the conveying paths only has to correspond to the transverse extension of the vehicle body. At the same time, a storage place that is only accessible from the side can be occupied with a vehicle body by a lateral conveyance. The number of storage area storage places is variable for the same total base area and can thus be adapted to different vehicle body sizes and shapes or types of storage. The total base area of the area storage can also be easily increased or reduced.

In a further development of the invention, it can be provided that the floor conveyor vehicle and the vehicle body or/and the vehicle body mount are configured such that the vehicle body or/and the vehicle body mount can be traveled under by the floor conveyor vehicle. In this way, the coupling between the vehicle body or vehicle body mount respectively and the floor conveyor vehicle can occur in a simple way—namely by traveling under the vehicle body or the vehicle body mount respectively. Preferably, the floor conveyor vehicle comprises a lifting device by means of which, after the vehicle body and/or the vehicle body mount has been travelled under, the same is lifted by means of the lifting device and the coupling between the vehicle body and/or the vehicle body mount and the floor conveyor vehicle can occur. A further advantage of the capability of being traveling under of the vehicle body and/or the vehicle body mount is that a floor conveyor vehicle can travel under (effectively a tunneling) the vehicle body or vehicle body mount respectively to a further vehicle body or vehicle body mount—possibly located behind it. This can significantly shorten the length of a conveying distance and/or significantly shorten the time required to remove a specific vehicle body from the area storage, particularly in conjunction with the omnidirectional mobility of the floor conveyor vehicle. The ability to be "traveled under" here refers to the area projected by the vehicle body onto the movement plane of the floor conveyor vehicle. The ability to be traveled under of 100% means that the entire contour of the floor conveyor vehicle is located underneath the vehicle body. At 90%–50%, half of the contour is below the vehicle geometry.

In an advantageous configuration of the invention, it is provided that the vehicle body or/and the vehicle body mount can be travelled under from a first direction of conveyance and a second direction of conveyance. The first direction of conveyance and the second direction of conveyance thereby form an angle of at least 60°, preferably an angle of 90°. The ability of being traveled under of the vehicle body or the vehicle body mount respectively from two conveying directions which are, for example, different, perpendicular to each other—preferably perpendicular to each other—increases the flexibility in occupying the total storage area and the selection of a suitable removal or occupation calculation respectively of a suitable removal or occupation path respectively.

In a configuration of the invention, it can be provided that the vehicle body mount comprises at least two support areas. The two support areas can be configured as point and line bearings, for example. In a practical configuration, the two support areas can each comprise two support elements, resulting in a total of four support elements, for example in the form of struts.

In particular, in this context, the support areas can be arranged and configured such that the floor conveyor vehicle can travel between two support areas to a stop position along a first direction of conveyance and can leave the stop position in a second direction of conveyance. The stopping position can thereby be located, in particular, underneath a vehicle body mount or, in particular, between the supporting areas. In a concrete configuration, the floor conveyor vehicle can thus, for example, travel along the longitudinal extension of a vehicle body under the vehicle body mount, couple with the vehicle body mount and continue traveling with the coupled vehicle body mount in a direction of conveyance transverse to the longitudinal orientation to the longitudinal axis of the vehicle body.

In an exemplary embodiment of an area storage, it can be provided that the vehicle body mounts are mounted stationarily on the storage area. This minimizes instabilities during occupation and removal processes of a vehicle body from the vehicle body mount.

Alternatively, it can be provided that the vehicle body mounts can be moved by the floor conveyor vehicle within the storage area. This enables a change of the storage area occupied by the vehicle body mounts and thus, for example, a re-densification of the occupied storage area with storage places and/or a rearrangement to adapt to, for example, the size of the vehicle bodies to be received by the storage places.

A combination of stationary and movable vehicle body mounts is also possible.

In a preferred embodiment, it can be provided that the storage area can be moved locally and/or divided by means of the floor conveyor vehicle. For example, the storage area can be enlarged, reduced, relocated or divided without interruption during operation without the need for any constructive intervention.

A further development of the invention provides that the portion of the storage area occupied by a storage place is determined by the size of the corresponding vehicle body and an additional function supplement portion. For example, in the case of a conventional vehicle body, the function supplement portion can be at least 10 cm. If sufficient space is to be provided for a person to walk on the storage area, a function supplement portion of, for example, 50-60 cm can be provided. For example, a function supplement portion of at least 100 cm must be provided for any escape routes that may be necessary. If, on the other hand, a travel path is to be formed, a distance of at least 250-300 cm must be maintained to the next vehicle body.

In the event of further development, it is provided that the function supplement portion is variable. For example, the function supplement portion can be configured differently for one part of the storage area than for another part of the storage area, depending on requirements. A temporal variation of the function supplement portion can also occur if required.

In an embodiment, the number of storage places per storage area can be varied locally or in total. Thus, for example, parts of the storage area or the entire storage area can be densified or loosened with regard to the number of storage places per storage area.

An advantageous embodiment of an area storage provides an arrangement of the area storage between the processes of body-in-white production and painting, within the painting process and/or between the processes of painting and final assembly.

The object is also solved by a method for conveying vehicle bodies or/and vehicle body mounts. The method according to the invention comprising the steps of: coupling of a vehicle body and/or of a vehicle body mount with an omnidirectionally movable floor conveyor vehicle, conveying the vehicle body or/and the vehicle body mount in a first direction of conveyance, and changing the first direction of conveyance into a second direction of conveyance while maintaining the same relative orientation of the vehicle body and/or the vehicle body mount and the floor conveyor vehicle.

By means of these steps it is possible to occupy a storage area particularly flexibly and thus save time and resources or to remove or relocate vehicle bodies respectively.

BRIEF DESCRIPTION OF THE DRAWINGS
KURZE

In the following, embodiments of the invention are explained in more detail using the drawings.

FIGS. 4-9 show different arrangements of storage places on a storage area;
FIG. 10 shows a detailed view of an area storage with fixedly installed vehicle body mounts;
FIG. 11 shows a detailed view of an area storage with vehicle body mounts, which can be moved by means of a floor conveyor vehicle;
FIGS. 15-17, each show in a front and a side view different functional positions and situations of a floor conveyor vehicle for an area storage with fixedly installed vehicle body mounts;
FIGS. 18-23 show in a plan view various relative positions and movements of a floor conveyor vehicle and of a vehicle body mount in the case of a fixedly installed vehicle body mount;
FIGS. 24-25 each show in a frontal and a side view different functional positions and situations of a floor conveyor vehicle for an area storage with movable vehicle body mountings;
FIG. 26 shows in a front and side view a vehicle body mount with a cabin encompassing a vehicle body;
FIGS. 37-40 show, in a front and a side view in each case, different functional positions and situations of two alternative embodiments of a vehicle body mount/floor conveyor vehicle combination.

DESCRIPTION OF PREFERRED EMBODIMENTS

Figure 1:
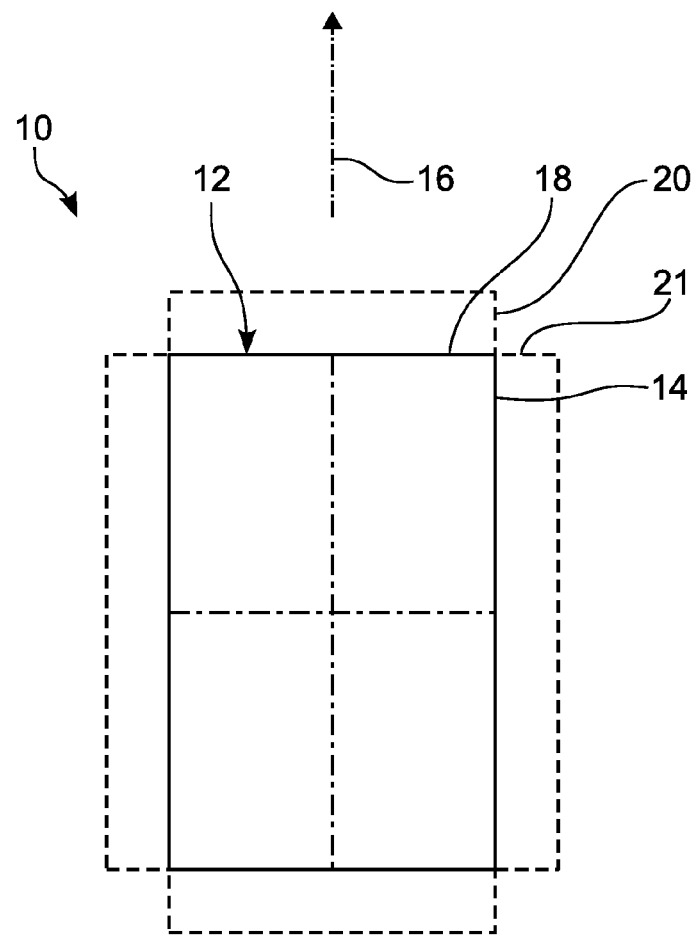
FIG. 1 shows a single storage element of an area storage.

FIG. 1 shows a highly schematized top view of a single storage element 10 of an area storage. The storage element 10 extends in one level and forms the maximum dimensions of a vehicle body (not shown here) as a rectangle 12. In this example shown in FIG. 1, the ratio of longitudinal extension 14—along a longitudinal axis 16, which is the preferred direction of movement for vehicle bodies—and transverse extension 18 is approximately 1:1.58. The total area occupied by the storage place 10 results from the area occupied by the vehicle body to be stored and a function supplement 20, 21, which is added as an absolute amount in each direction in the embodiment shown in FIG. 1. These function supplements 20, 21 can be provided on both sides of the longitudinal and transverse extension or only on one side and can vary depending on the size of the vehicle body and the intended movement sequences in longitudinal and transverse extension, for different vehicle bodies, for different storage area segments and/or for different floor conveyor vehicles.

Figure 2:
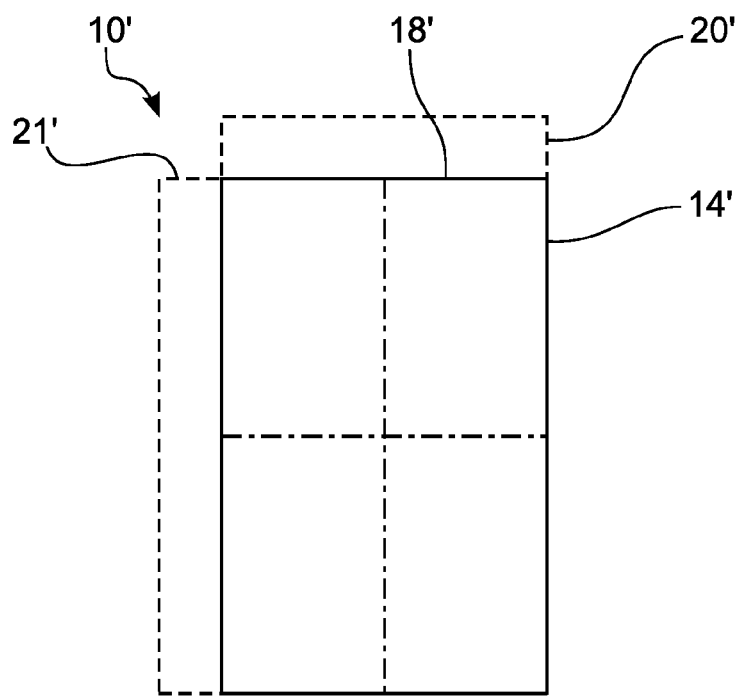
FIGS. 2, 3 show alternative embodiments of the storage element of FIG. 1.
Figure 3:
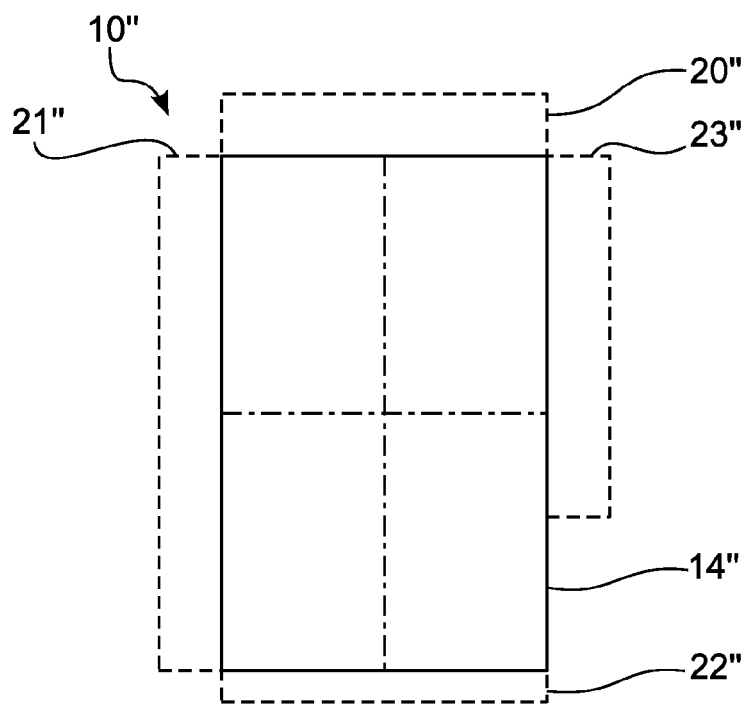

FIGS. 2, 3 show corresponding alternative embodiments 10', 10" of the storage element 10 of FIG. 1. The function supplements 20', 21' are only added on one side of the longitudinal extension 14' and the transverse expansion 18' respectively in FIG. 2.

The storage place 10" shown in FIG. 3, on the other hand, has two different function supplements 20", 22" in the longitudinal extension 14". In the transverse extension 18", however, the function supplements 21", 23" is the same on both sides along the transverse extension 18", but does not extend beyond the complete longitudinal extension of the storage place 10".

FIGS. 4-9 show in schematised top views various arrangements of storage places 10 on a storage area 24. In the embodiment of a storage area 24 shown in FIG. 4, the individual vehicle bodies have a rectangular, non-square, basic shape. Due to different function supplements in longitudinal and transverse direction, the basic shape of the storage place 10 is square. If the storage places are arranged as shown in FIG. 4, the basic shape of the storage place 24 is square. This makes it possible to occupy the individual storage places 10 as shown with an orientation of a single vehicle storage mount or vehicle body rotated by 90°.

The situation is different in the embodiment of FIG. 5. There, the result is a non-square basic shape of the storage area 24.

FIG. 6 shows a storage area 24, in which the individual storage element 10, which has a non-square, rectangular basic shape, is provided with a symmetrical function supplement in both longitudinal and transverse extension. Correspondingly, the arrangement of 3×4 storage places shown in FIG. 6 results in an overall rectangular basic shape of the storage area 24.

In comparison, the arrangement of the same number of storage places 10, as illustrated in FIG. 7, requires a visibly smaller base area due to a function supplement provided on one side only.

Figure 8:
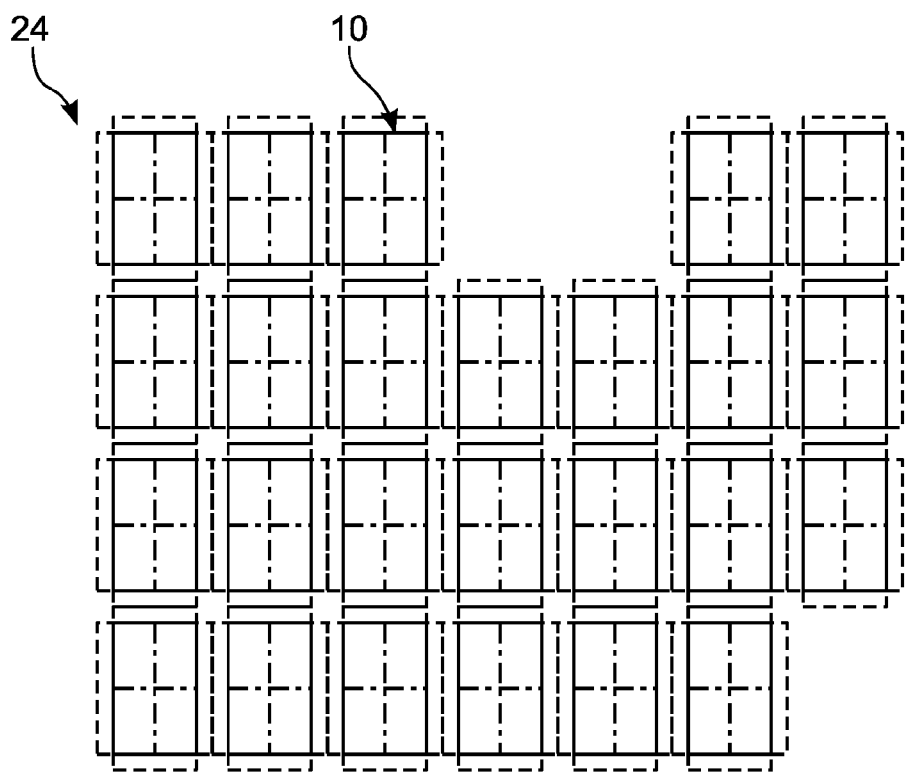

FIG. 8 illustrates a non-rectangular shaped storage area 24 of an area storage. This arrangement demonstrates the flexibility of the overall system in the utilization of given area basic shapes for the configuration of an efficient area storage.

Figure 9:
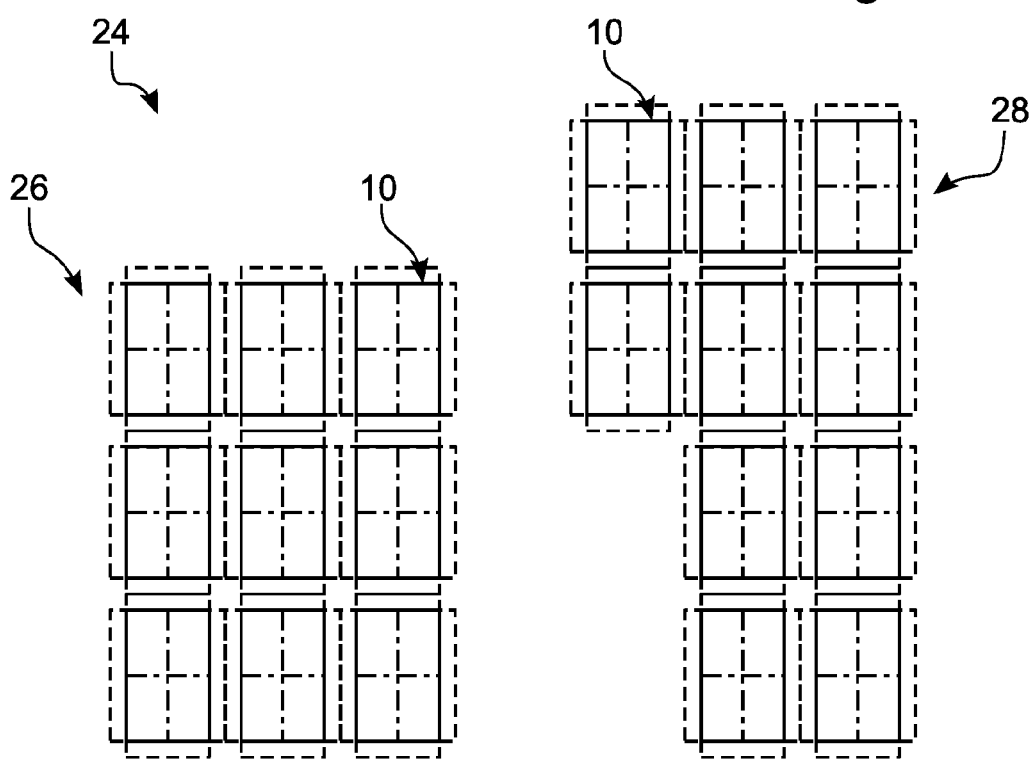

FIG. 9 shows a storage area 24 divided into two separate storage area segments 26 and 28. The first storage area 26 can, for example, be located on a first level, while the second storage area 28 can, for example, be located on another second level, which can be reached, for example, by an inclined travel that can be handled by a floor conveyor vehicle. Alternatively, a conveyor path to be crossed or other structural conditions could be located between the two segments 26, 28.

FIG. 10 shows a schematic perspective top view of substantial parts of an area storage 30 with fixedly installed vehicle body mounts 32. Three storage places 10 are shown in a row. This can already form a complete area storage 30, in reality such area storages 30 have a much larger number of storage places 10 (typically several dozen to several hundred storage places).

In the embodiment of an area storage shown in FIG. 10, each individual storage place 10 has a fixedly installed vehicle body mount 32 which cannot be moved without intervention. The vehicle body mount 32 works together with a floor conveyor vehicle 34, which in the embodiment at hand is configured to convey a vehicle body 36.

The floor conveyor vehicle 34 is dimensioned such that during a conveying process it is located under the vehicle body 36 and within the outer dimensions of the vehicle body 36. The floor conveyor vehicle 34 has a two-track design and, in the embodiment shown in FIG. 10, has a total of four wheels 38, of which at least two diagonally opposite wheels are driven and in total allow omnidirectional propulsion. As already explained, omnidirectional means that the floor conveyor vehicle 34 can move in any direction without having to turn its body. This is illustrated in the situation shown in FIG. 10, far right. The two floor conveyor vehicles 34, 34' shown could also be two movement situations of one and the same floor conveyor vehicle. Both floor conveyor vehicles 34, 34' are oriented parallel with their respective longitudinal axis to the longitudinal axis of the vehicle body 36. While the floor conveyor vehicle 34 moves under the vehicle body mount 32 in a direction of movement perpendicular to the longitudinal axis of the vehicle body 36, the floor conveyor vehicle 34' moves parallel to the longitudinal axis of the vehicle body 36. In both cases, the orientation of the body of the floor conveyor vehicle 34, 34' is maintained due to the omnidirectional conveyability of the floor conveyor vehicle 34, namely parallel to the longitudinal orientation of the vehicle body 36.

The floor conveyor vehicle 34 has a lifting device 40. The lifting device 40 is configured such that it is possible to lift the vehicle body 36 to such an extent that the vehicle body 36 can be deposited on a vehicle body mount 32 and picked up again.

The vehicle body mount 32 has four support areas 42 in the form of four support elements 44 in the embodiment shown in FIG. 10. The individual support elements 44 are arranged such that the floor conveyor vehicle 34 can pass between the individual support struts of the support elements 44 and thus, passing under the vehicle body or under the vehicle body 36, can reach another vehicle body. In this embodiment, the support elements 44 are firmly anchored to the ground and configured so that they can bear the total load of a vehicle body 36.

FIG. 11 shows in a further detailed view an area storage 30' with vehicle body mounts 32', which can be moved by means of the floor conveyor vehicles 34. The general structure of the area storage is thereby largely the same, so that the overall structure is not explained again to avoid repetition. Only the relevant differences are discussed.

In contrast to the embodiment of FIG. 10, the vehicle body mounts 32' are configured to be movable in the case of FIG. 11. This means that the vehicle body 36 can be transported together with the vehicle body mount 32', for example. Alternatively or in addition, it can also be provided that the vehicle body mount 32' can be transported without a coupled—here: laid-on—vehicle body 36, for example to reconfigurate the storage area 24 with regard to the spatial arrangement of the storage places.

The vehicle body mounts 32' are otherwise similarly constructed—they comprise four support elements 44', between which the floor conveyor vehicle 34 can pass.

Figure 12:
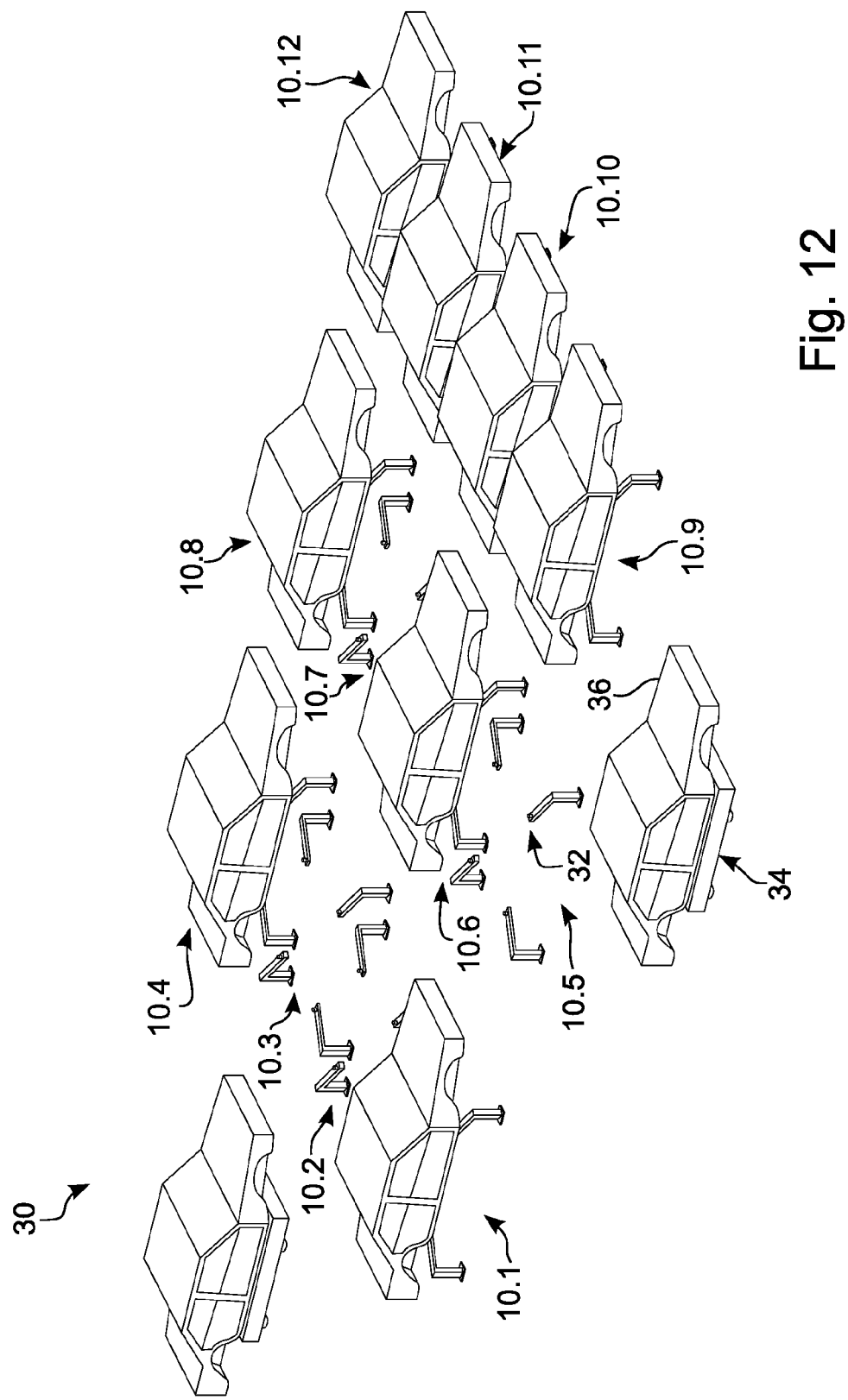
FIG. 12 shows an area storage with twelve storage places with fixedly installed vehicle body mounts in a functional situation.

FIG. 12 shows, in an exemplary embodiment, an area storage 30 with twelve storage places 10 with fixedly installed vehicle body mounts 32 in a functional situation. The size of the area storage 30 shown here is for illustrative purposes only and can be scaled up (or down) as required.

The functional situation is as follows: Of the twelve available storage places 10.1 to 10.12, all of them are provided with a fixedly installed vehicle-body mount 32 and storage places 10.1, 10.4, 10.6, 10.8 and 10.9-10.12 are occupied by a vehicle-body 36. A further vehicle body 36 is conveyed in an approaching fashion by means of a floor conveyor vehicle 34 to occupy the storage place 10.3. At the same time, a vehicle body 36 was removed from the storage place 10.5 by means of a further floor conveyor vehicle 34.

Figure 13:
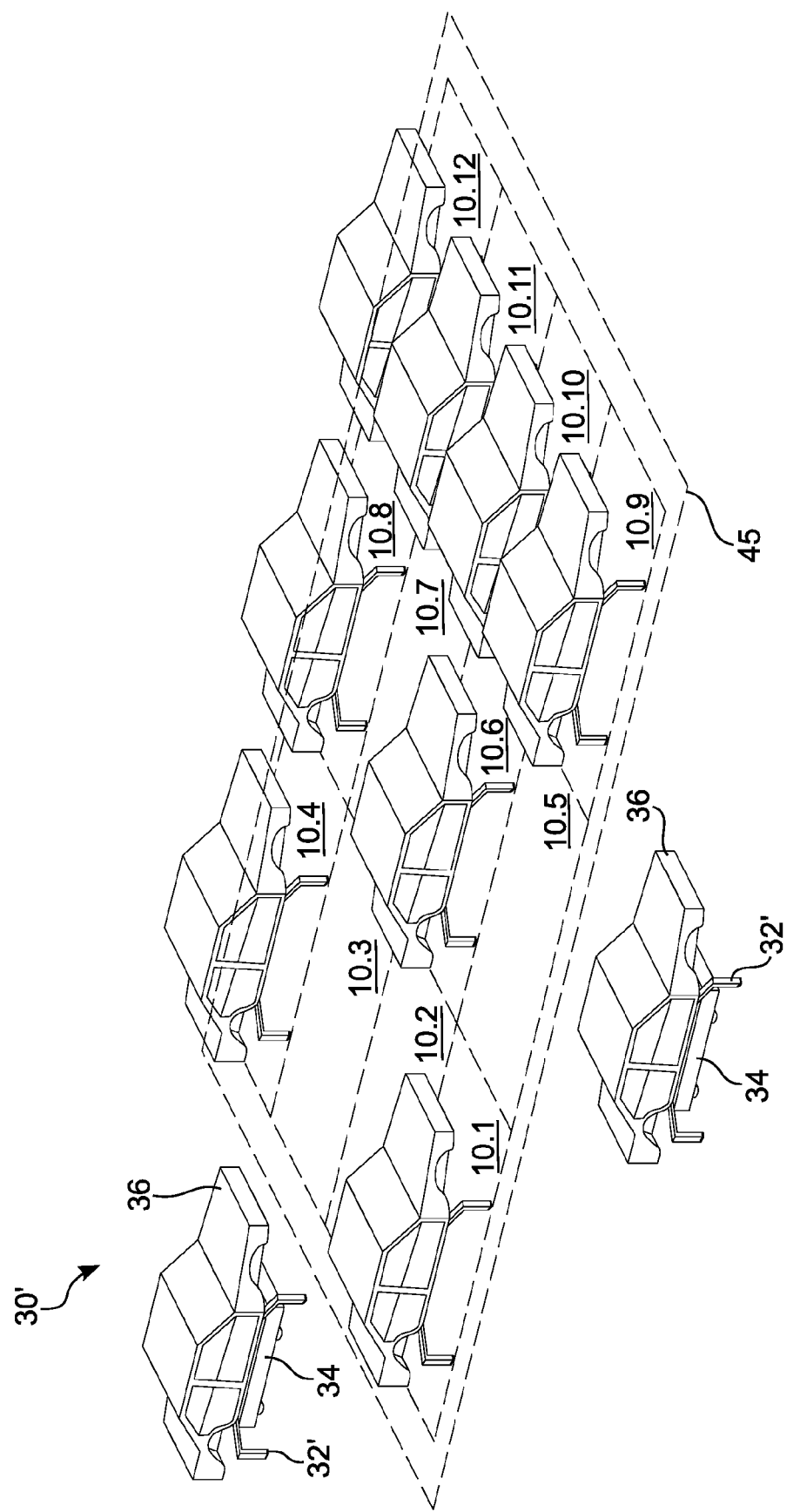
FIG. 13 shows the area storage of FIG. 12 with movable vehicle body mounts.

FIG. 13 illustrates the same functional situation for an area storage 30' with movable vehicle body mounts 32' instead of the fixedly installed vehicle body mounts 32 of the embodiment shown in FIG. 12. The area 45 available for the configuration of storage places is marked with a dashed border.

In the illustration in FIG. 13, the big advantage of non-fixedly installed, but rather movably configured, vehicle body mounts 32' is apparent. Different types of area occupancy, especially different area occupancy densities, can be realized in an easy fashion without the need for structural changes or interventions.

Figure 14:
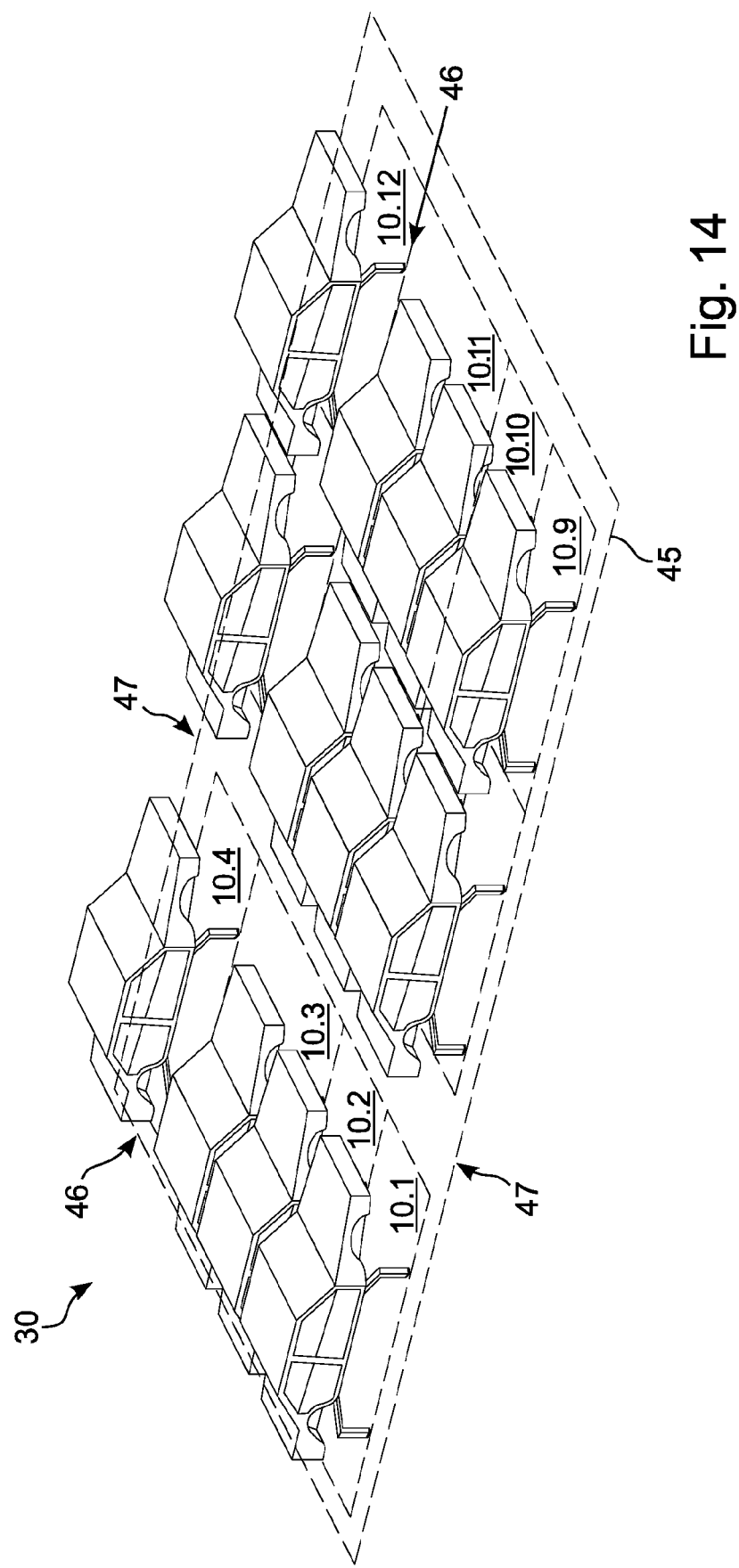
FIG. 14 shows the area storage of FIG. 13 in a different storage place configuration with the same usable area.

FIG. 14 demonstrates this principle using the area storage of FIG. 13, which is shown in FIG. 14 in a different storage place configuration with the same usable area. In contrast to the occupancy of FIG. 13, an aisle 46 between the occupancy areas 10.3 and 10.4, 10.7 and 10.8 (not explicitly shown) as well as 10.11 and 10.12 and an aisle 47 between the occupancy areas 10.1-10.4 on the one hand and 10.5-10.8 on the other hand has been created by moving the vehicle body mounts 32', in particular on the occupancy areas 10.1-10.3, 10.5-10.7 and 10.9-10.11, closer together laterally and moving them apart between the loading areas 10.1-10.4 on the one hand and 10.5-10.8 on the other. This can be useful, for example, when pre-sorting the colours for the top coat. Depending on the different top coats used in the production process, the pre-produced base coats can be stored within the area storage 30 of FIG. 14, sorted by light, medium and dark. With the created aisles 46, 47, for example, the vehicle bodies stored on the left and right of the respective aisle can be individually removed as required.

FIGS. 15-17 show, in a front and a side view respectively, different functional positions and situations of a floor conveyor vehicle 34 for an area storage 30 with fixedly installed vehicle body mounts 32

FIG. 15 shows a vehicle body 36, which is coupled to a floor conveyor vehicle 34 while resting on it. The vehicle body 34 can, for example, be coupled directly to the floor conveyor vehicle 34 or by means of a skid (not shown). The floor conveyor vehicle 34 is in its transport position, which it adopts when covering longer distances. In this transport position, the lifting device 40 can, for example, be in a lower position in order to reduce possible rolling or tilting movements of the vehicle body 36 during travel.

FIG. 16 shows the functional situation of an entry into or exit from a storage place 10. In such a situation, the lifting device 40 is in an upper position to allow the vehicle body 36 to be placed on the vehicle body mount 32.

FIG. 17 shows the situation shortly after the vehicle body 32 has been deposited. The lifting device 40 is again in its lower position. By lowering the lifting device, the vehicle body 36 comes into contact with the vehicle body mount 32 and is now supported on it. The floor conveyor vehicle 34 is thus free and can leave the storage place 10 again, for example, by exiting laterally between the support elements 44.

FIGS. 18-23 show in a top view various relative positions, dimensions and movements of a floor conveyor vehicle 34 and a fixedly installed vehicle body mount 32.

FIG. 18 shows in a top view the relative arrangement and dimensions of vehicle body 36 and vehicle body mount 32 with support elements 44. As can be seen, the support elements 44 of the vehicle body mount 32 are arranged and configured such that they can serve as a seat at four points for the vehicle body 36 and support it.

FIG. 19 shows the relative dimensions of the vehicle body mount 32, in particular of the support elements 44, and the floor conveyor vehicle 34 as well as the lifting device 40. The illustration shows that the seats 43, which are close to the ground, of the support elements 44 are arranged such that the floor conveyor vehicle 34 can travel between two support elements 44 in a longitudinal direction as well as in a transverse direction in order to thereby get under the vehicle body mount 32 or, respectively, to leave it and the storage place.

These situations are illustrated in the FIGS. 20 and 21 described below. Whereas in FIG. 20 the floor conveyor vehicle 34 has traveled from under or could travel longitudinally to the vehicle body 36 or the vehicle body mount 32 respectively, FIG. 21 shows the case where the floor conveyor vehicle 34 could travel under or could travel from under the vehicle body mount 32 in transverse direction.

FIG. 22 shows the situation where the floor conveyor vehicle 34 can perform a turn about 90° under the vehicle body mount 32 between the support elements 44. This is indicated by the dotted circle 50.

Accordingly, the floor conveyor vehicle 34 can enter or exit along its longitudinal direction transverse to the longitudinal direction of the vehicle body mount 32 and thus also transverse to the longitudinal direction of the vehicle body 36.

FIGS. 24-25 each show in a front and a side view a transport position and a lowered position of a floor conveyor vehicle 34 for an area storage 30' with movable vehicle body mounts 32'. Since in the case of the movable vehicle body mount 32', the movable vehicle body mount 32' is transported along with the vehicle body 36 during transport, it is necessary to leave the lifting device 40 in the raised position during a distance travel in order to achieve sufficient free space below the support elements 44. This situation is shown in FIG. 24.

FIG. 25 shows the other possible position in which the floor conveyor vehicle 34 has lowered its lifting device 40. In this position the vehicle body 32' contacts the ground. Accordingly, the floor conveyor vehicle 34 can exit or enter underneath the area below the vehicle body mount 32'.

FIG. 26 shows in a front and side view an alternative vehicle body mount 32" with a cabin 52 encompassing a vehicle body 36.

FIGS. 27-34 show various configurations and embodiments of an area storage 30" in perspective top views. The area storage shown in FIGS. 27-34 extends in a travel level 53 and has movable vehicle body mounts 32'. The number and spatial arrangement of the individual storage places 10 or storage elements respectively can be varied accordingly.

Figure 27:
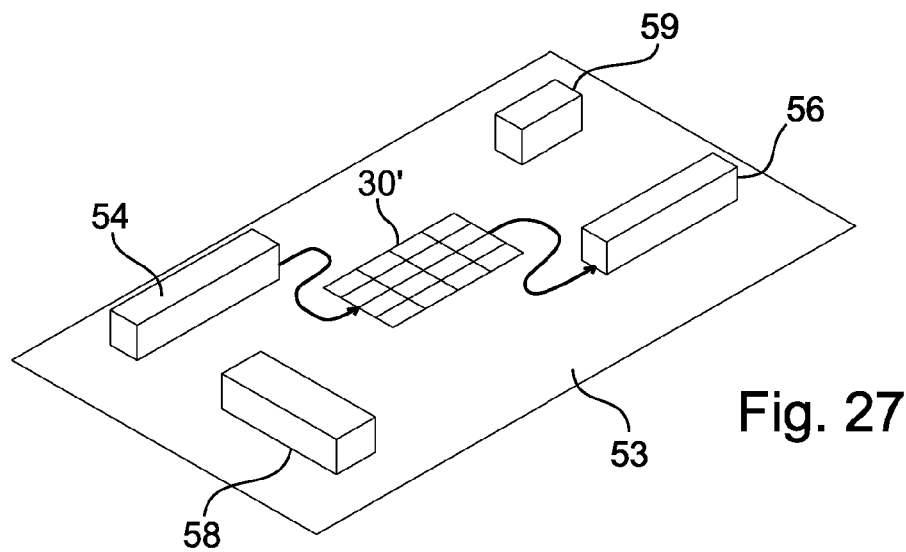
FIGS. 27-34 show in perspective top views various configurations and embodiments of a area storage.

FIG. 27 shows the area storage 30' integrated between an upstream process 54 and a downstream process 56. The vehicle bodies 36 originating from the upstream process can be stored in the area storage 30'. The area storage 30' can thereby be fitted within the area storage level 53 between existing building installations 58, 59.

Figure 28:
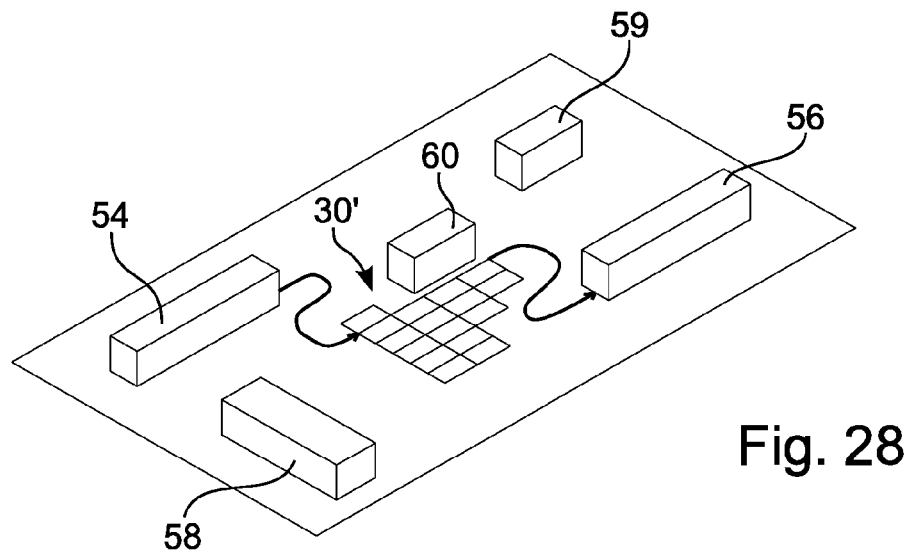

FIG. 28 shows the situation where a further building part 60 has been added. Correspondingly, part of the storage places 10 have been relocated without great effort and without affecting the capacity of the area storage 30'.

Figure 29:
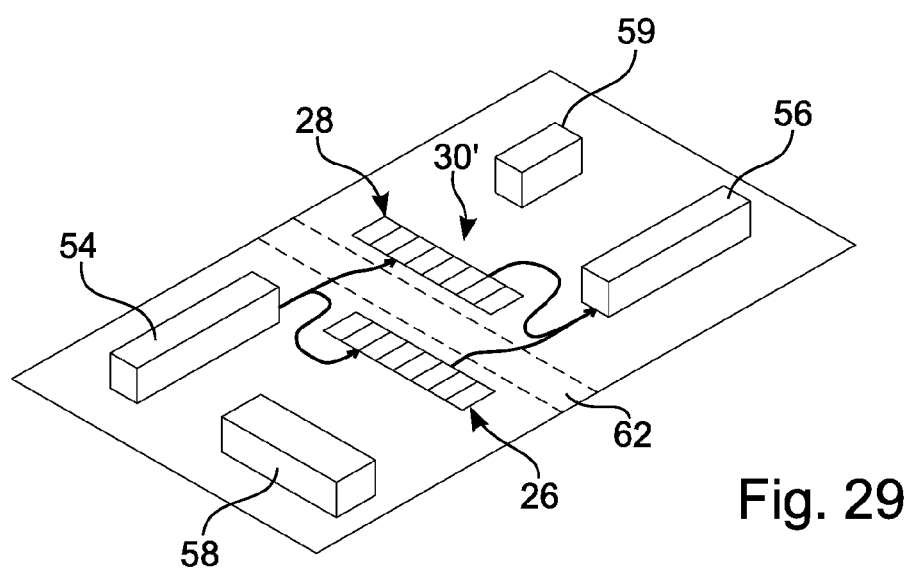

In FIG. 29, a temporary free area 62 was created based on the situation in FIG. 27. This, too, can be achieved without much effort with the existing floor conveyor vehicles 34, in the example shown here by creating two separate storage area segments 26, 28.

Figure 30:
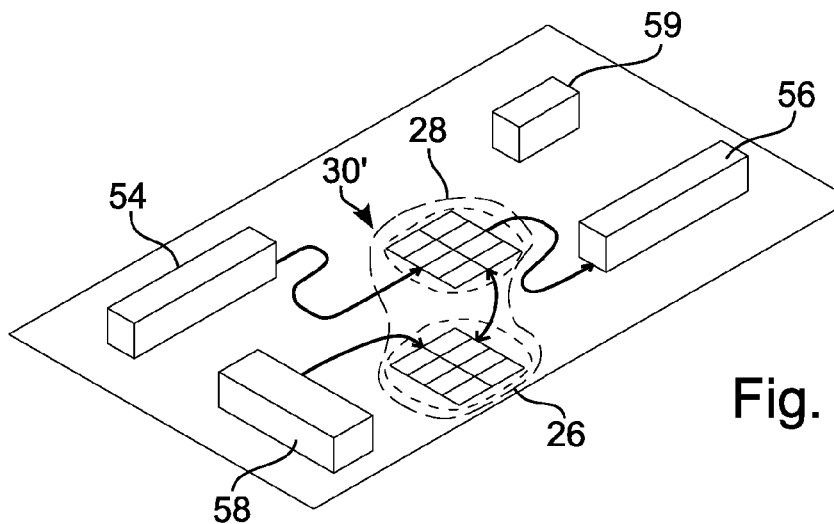

While the free area 62 shown in FIG. 29 is only temporary, the area storage 30' of FIG. 30 provides a fixed separation of the storage area into two segments 26, 28. In this way, for example, vehicle bodies 36 from two upstream processes 54, 58 can each be stored in separate storage segments 26, 28, which can, however, be located in one building, and, if required, be fed into the downstream process 56.

Figure 31:
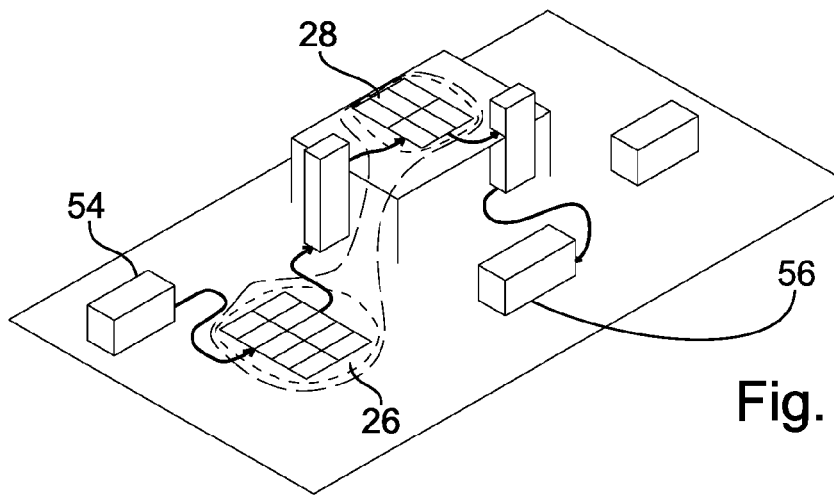
Figure 32:
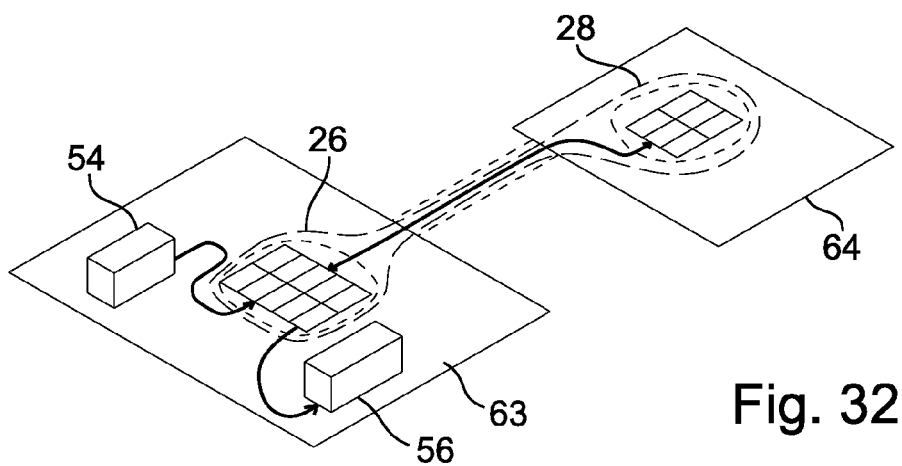

FIG. 31 shows one of the two storage segments 28 on a spatially higher second level. FIG. 32 shows that the second segment 28 is also located on a second level, but in a second building 64, which is separate from the first building 63.

Figure 33:
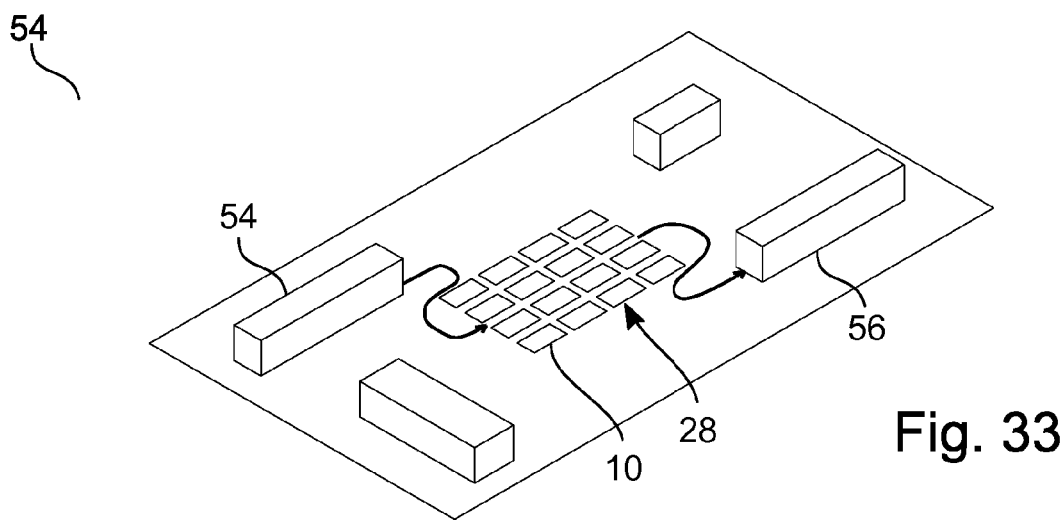
Figure 34:
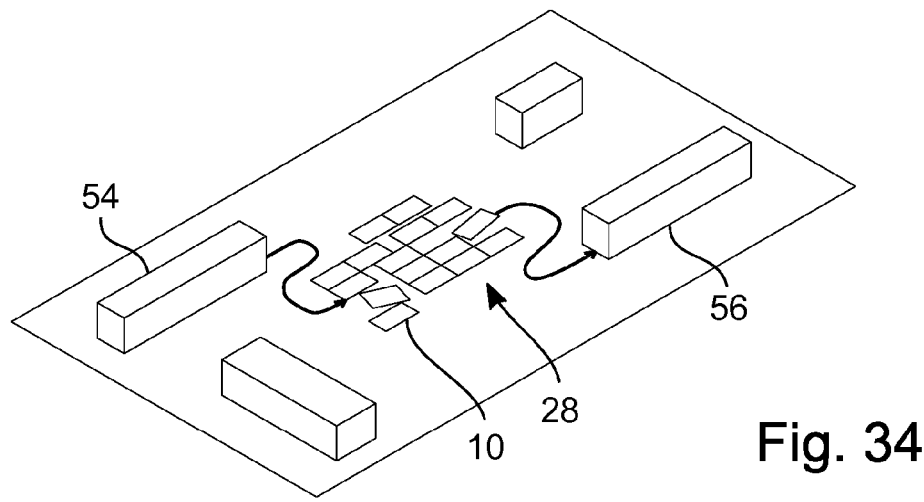

Other ways to apply dynamic storage allocation would be to arrange the individual storage places 10 in a loosened form, shown in FIG. 33, or in a chaotic form, shown in FIG. 34.

Figure 35:
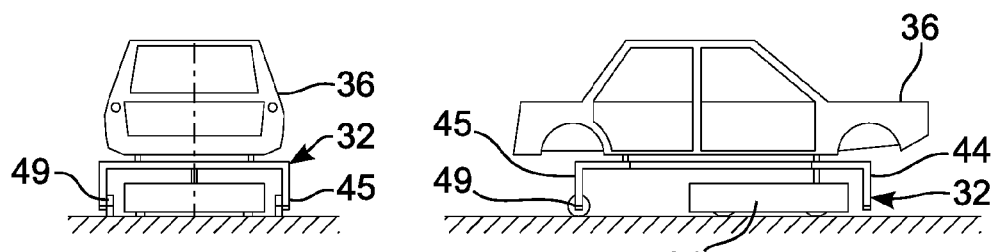
FIGS. 35, 36, each show in a front and a side view different functional positions and situations of an alternative embodiment of a vehicle body mount/floor conveyor vehicle combination.
Figure 36:
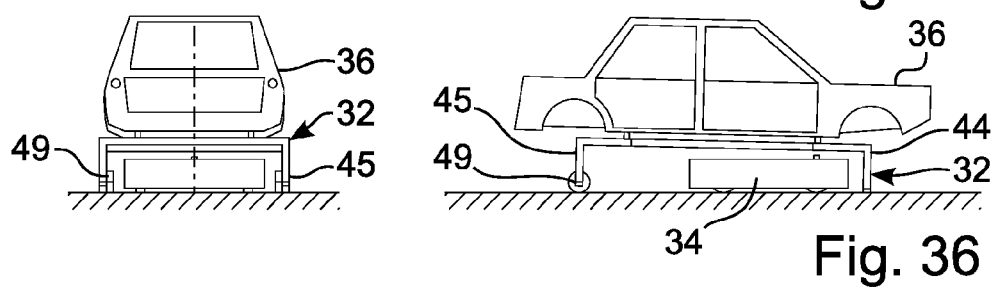

FIGS. 35, 36 show in a front and a side view different functional positions and situations of an alternative embodiment of a vehicle body mount/floor conveyor vehicle combination. The embodiment shown in FIGS. 35, 36 provides only two support elements 44 instead of four essentially identically configured support elements 44 of a vehicle body mount 32. The other two support elements 45 are provided with free-rolling rollers 49 on their side which is close to the ground. Accordingly, the floor conveyor vehicle 34 can be configured such that it lifts the vehicle body mount 32 only on the side opposite the rollers 49 and, to a certain extent, tows it away.

This configuration allows the floor conveyor vehicle, which is configured as a pulling machine, to be configured for lower lifting forces. FIG. 35 shows a driving situation, FIG. 36 a parking situation.

FIGS. 37-40 each show in a front and a side view different functional positions and situations of two alternative embodiments of a vehicle body mount/floor conveyor vehicle combination, in which the floor conveyor vehicle 34 has two separate travel bodies 34.1, 34.2. The two moving travel bodies are mechanically separated from each other, but operate with each other by means of data transmission. Corresponding sensors and data transmission means are provided to enable the two travel bodies 34.1, 34.2 to operate in a jointly coordinated manner.

FIG. 37 shows the situation in which the travel bodies 34.1, 34.1—which are generally configured for omnidirectional driving—are arranged with their longitudinal axes transverse to the direction of travel and the vehicle body mount 32' is raised. In FIG. 38 the vehicle body mount 32' is lowered.

FIGS. 39 and 40 provide an orientation of the travel bodies along the longitudinal axis of the vehicle body mount 32' and thus also along the vehicle body 36 itself. FIG. 39 shows a driving situation, FIG. 40 a situation in which the vehicle body mount 32' is deposited.

In general, the following applies to the invention:

A two-dimensional area with planar extensions in X and Y direction can serve as a simple area storage, wherein, for example, the X direction should correspond to the longitudinal axis of the workpiece Xw and the Y direction to the transverse axis of the workpiece Yw.

The area of the storage place results by multiplying the dimensions of the workpiece in X-direction Lx (including a one- or two-sided function supplement Fx) with the dimensions of the workpiece in Y-direction By (including a one- or two-sided function supplement Fy).

The total current area of the area storage is the sum of the storage places with their respective individual areas. The area and/or the sum of the storage places is variable within limits, since workpiece sizes and function supplements can be varied.

The vehicle body or the driver's cab can be fixed on a workpiece carrier, such as a skid or suitable trusses. The workpiece carrier can be received, transported and deposited by the floor conveyor vehicle. The workpiece can also be received directly by the floor conveyor vehicle.

The workpiece carrier with vehicle body can be placed directly on the floor or on separate mounts. It is also possible to place the vehicle body directly on the vehicle mount.

The floor conveyor vehicle can load or unload a parked workpiece carrier or omnidirectionally travel under a vehicle body and lift it for transport.

A mobile vehicle body mount can be transported by the floor conveyor vehicle with or without a vehicle body.

A stationary vehicle body mount can be fixed such that it cannot be transported by the floor conveyor vehicle. Alternatively, the stationary vehicle body mount can be secured against unwanted horizontal movement only, for example by means of ground sleeves, but can be movable when lifted by means of the floor conveyor vehicle.

A stationary vehicle body mount can be movably setup on the setup area. Thus, the number and size of the storage places within the area storage can be configured variably by manual intervention. For example, in a gridded floor hole system, a fixation in vertical direction can occur.

A stationary vehicle body mount can be attached to the setup area for protection against horizontal movement.

Since the area storage does not have stationary conveyor elements as an interface to other processes, separate floor conveyor vehicles are required for storage, relocation and/or removal. At least one free storage place is required for the storage of a vehicle body. This can be located on one of the outer sides of the area storage. In this case, direct storage by the floor conveyor vehicle is possible, as it can travel omnidirectionally. If the at least one free place is not located on a directly accessible outer side and cannot be approached directly, this free place is created as a gap at an externally accessible location by relocating vehicle bodies in the area storage to other storage places.

The relocations can be performed by the delivering floor conveyor vehicle or another floor conveyor vehicle. If the relocation is performed by the delivering floor conveyor vehicle, then the vehicle body can be buffered intermediately in advance if necessary.

However, it is advantageous if another floor conveyor vehicle can perform these relocations. This other floor conveyor vehicle can, for example, be the floor conveyor vehicle that delivered beforehand. However, one of the total number of floor conveyor vehicles can also be instructed for this relocation process.

Several floor conveyor vehicles can also perform relocations. A vehicle body can be relocated directly to its target place during a relocation process or temporarily stored within the area storage and thereby, for example, brought to its final storage place by two different floor conveyor vehicles.

It can be advantageous if a floor conveyor vehicle is constructionally intended especially for the relocation processes. For example, with other driving parameters, safety devices and navigation systems. The energy supply can also be optimised for the case of relocation.

When creating the relocation orders, the area storage management can already take into account pending storage and/or removal orders for path and/or production optimization. A foresighted relocation is possible.

Relocations can also be initiated when a vehicle body is removed from storage. Relocations can also be triggered by upstream and/or downstream production processes.

In the case of an area storage with movable vehicle body mounts, no stationary vehicle body mounts for the storage places can be mounted in the configurable area storage. The storage places are defined virtually by the control. The size of the individual storage places results from the data for the vehicle bodies and the corresponding function supplements. The vehicle bodies are hereby defined by the respective real external dimensions. These can be different for different vehicle bodies within the area storage.

Function supplements are values that are added to the real vehicle body dimensions to allow space for safety distances or process steps. Safety distances are required to take into account contact of the vehicle bodies within the area storage due to tolerances and/or inaccuracies. Furthermore, this also includes free spaces for access by persons (temporary or permanent) in the form of maintenance accesses or escape routes. A space for a necessary process step is, for example, a supplement for a turn to change the directional orientation of the vehicle body. This occurs, for example, during removal from the area storage with subsequent transfer to a transfer area. Here the storage is to be performed as movement "vehicle body forward" and during the removal as movement "vehicle body backward".

The control creates a total area requirement for the respective individual vehicle body from the vehicle body data and the function supplements. This means that different storage place sizes can result for the same vehicle body and different function supplements. Similarly, the same storage place sizes can result for different vehicle bodies and different function supplements. The determined storage place size is assigned to the floor conveyor vehicle including vehicle body.

The safety installations of the floor conveyor vehicles can adapt to the changed spatial conditions and adjust the driving parameters if necessary.

The assigned storage place size can be changed within predefined limits during the stay in the area storage. For example, for relocations or in case of spatial restrictions.

The area storage control can thus determine an optimized area storage usage at any time. This can be variable, for example, for upstream and/or downstream processes. Thus a "densified" or "loosened" area storage can be realized.

This system is particularly advantageous if vehicle bodies of a certain size (for example large) have to be stored over a certain period of time and at another time vehicle bodies of a different size (for example small) have to be stored at least partially. Then the storage places can be organized accordingly without mechanical modifications and if necessary the total capacity can be increased.

The vehicle bodies can also be stored in a "densified" fashion at suitable times such as production-free times. This is achieved by a new allocation of function supplements per vehicle body and subsequent relocation of the vehicle bodies within the area storage. This can be advantageous, for example, if the area storage has to be crossed temporarily for a certain period of time by traffic (persons, vehicles . . . ) for maintenance measures or material transport.

The area storage management system can, with appropriate knowledge of the structural conditions and taking into account the actual place situation, at least partially relocate the current area storage from its originally defined area. As an example, an entire area storage with 50 places of a defined size could first be expanded by 30 places data-wise. These 30 additional places then form an additional area storage segment. The total area storage then consists of two area storage segments. These can be spatially separated. For example, the original area storage can be on top of the building, while the expansion is on a different level. You can also have both segments on the same level.

These 30 additional places are then filled either by relocations from the first area storage segment or by storage from the production process, wherein vehicle bodies can be stored in a wide variety of processing stages. The 30 storage places that become free are then taken from the first area storage segment data-wise. This segment has thus been reduced in size. This process can of course be performed several times until the number of places of the first area storage segment is zero. Then the entire area storage has been relocated dynamically. Of course, this relocation can also be done for all places in one step.

This can also be used as storage optimization if this functionality is performed during periods of low transport volume (breaks/end of shift).

Such an area storage can be used to receive vehicle bodies. These can have different processing states. Finished or partially assembled body-in-white, painted bodies in different processing stages (freshly painted or already dried bodies with different coatings).

The spatial arrangement of the area storage can be performed in all building levels, either completely or partially, as long as these levels provide the appropriate areas.

It is also possible to create the area storage on existing buildings as the top element on or as a roof. If it is built on an existing roof, an air hall can also be used as a protective enclosure.

Provided that no negative influences are to be feared, vehicle bodies can also be realized without additional covering virtually in the open air on or next to buildings, at least temporarily. In this case, the weather influences must be taken into account in the configuration of the floor conveyor vehicles for this area.

The administration and control of the area storage is performed depending on the surrounding production facilities.

In the embodiment "mobile area storage", in which each vehicle body carries its own mount with itself, it is advantageous if the floor conveyor vehicle is equipped with sensors for environment detection. In this way, the floor conveyor vehicle moves freely in the warehouse image and navigates hereby independently.

This enables the floor conveyor vehicles to move independently from the outer area storage areas to the inner area storage areas in a loaded or unloaded state. Identification systems and/or recognition systems such as scanners, QR code readers, RFID, . . . can be used for this purpose.

For monitoring purposes, one or more optical recognition systems can be installed next to or above the area storage to support the floor conveyor vehicles.

It is advantageous if these systems detect a change in position of mounts positioned in the areas of the area storage which were not performed by the floor conveyor vehicles and pass these deviations on to the concerned floor conveyor vehicles to correct the route specifications. This can also be performed by an indoor radar.

In case of a favourable configuration of the mobile vehicle body mount as the interface between the floor conveyor vehicle and the vehicle body, vehicle bodies with a connected mobile mount can pass through several production steps in succession without being separated from each other.

For example, the fixation of first body components can already be performed in the body-in-white phase and the completion of the vehicle body in the body-in-white can be performed without changing the mobile transport mount. Such manufactured body-in-white bodies can then be transferred with the mobile transport mount via suitable body-in-white conveyors to the floor conveyor vehicle suitable for area storage and, if necessary, intermediately buffered in an area storage or an area storage segment before the next processing step.

For the next processing step, the car bodies can be transferred to the next processing step with the mobile vehicle body mounts. This can be, for example, dip painting with subsequent drying process. The vehicle bodies dried and primed in this way can also be intermediately stored in the area storage and made available for the next processing step. This would be, for example, a painting facility for all necessary painting and drying processes or a final assembly line.

Of course, it is also possible to convey the vehicle body with the associated mobile vehicle body mount partially on other conveyor elements.

With the appropriate constructional configuration of the mobile vehicle body mount, it is also possible to convey the vehicle body directly to other processing stations with the floor conveyor vehicle. For example, in cabin-like processing areas such as control stations, painting cabins or drying tunnels.

Place/Workpiece Identification:

It is advantageous that the vehicle body mounts are provided with an identification element such as an optical code, a radio-based active/passive ID carrier, in order to detect their position within the area of the area storage. The detection can occur by one or more stationary or mobile detection devices. Mobile detection devices can be moved by persons or attached to floor conveyor vehicles.

For example, if the detection devices are attached to a floor conveyor vehicle, this floor conveyor vehicle can perform an identification travel within the area of the area storage in order to detect the position of the respective vehicle body mounts and transfer them to the area storage control.

It is advantageous if the floor conveyor vehicle is also equipped with recognition sensor technology that enables the position (orientation detection) of the vehicle body to be recognized. A vehicle body identification can also be performed by a corresponding ID carrier/reader constellation between the vehicle body and the floor conveyor vehicle.

Energy Supply:

An accumulator system is advantageous for the floor conveyor vehicles. A capacitor-based system is particularly advantageous for special relocation vehicles, for example.

It can be advantageous if at least one storage place is equipped with a charging component for the floor conveyor vehicles.

Preferably, the power supply of the floor conveyor vehicles occurs outside of the area storage, such as load change positions and/or waiting areas or processing places.

A photovoltaic component can also be used in part to supply energy. The energy storage of the floor conveyor vehicle can be charged by the photovoltaic components and also serve as an energy storage for other consumers. This is particularly advantageous if the floor conveyor vehicle can store at least part of its energy back into the production network during rest periods.

Control:

It can be advantageous if, during periods of low transport demand, unneeded floor conveyor vehicles are located in the area of the area storage below the mounts in waiting position.

Based on the current degree of filling of the area storage, in addition to manual triggering by operating personnel, a relocation of area storage segments to other spatial areas or a relocation within the existing area of the area storage for capacity adjustment can be performed by upstream or downstream production systems.

Interfaces with Other Equipment:

In the case of the embodiment with a stationary vehicle body mount, the vehicle body can be transferred from an external transfer station to the floor conveyor vehicle with or without a skid. An approach to the area storage occurs. The final storage place is either determined beforehand by the system or selected during the stay in the area depending on the situation (shortest route, availability, foresighted removal) if there is more than one free storage place.

Removal is performed according to similar criteria, however in relation to the floor conveyor vehicle, since the requested vehicle body and its storage place is fixed.

If several area storage segments are located on different levels of the floor conveyor vehicle and can only be reached via vertical transfers, there are different variants: For example, the floor conveyor vehicle can be moved to another level with a vertical transfer unit and thus serve several area storage segments.

Alternatively, the floor conveyor vehicle can transfer a vehicle body to a vertical transfer unit and remain on its level. The vehicle body is transferred on another level from another floor conveyor vehicle to the area storage area to another level.

This also applies analogously in the case of only one area storage in one driving level and upstream/downstream processing processes in other levels that are operated with automated guided vehicle (AGV).

What is claimed is:

1. An area storage for storing vehicle bodies whose longitudinal extension is at least one and a half times the transverse extension, comprising:
    a) a storage area with at least two storage places and two associated vehicle body mounts, wherein the storage area is configured such that vehicle bodies can be stored on the storage area in one level on the at least two storage places on one of the vehicle body mounts in each case,
    b) at least one multi-track floor conveyor vehicle which can be coupled to a vehicle body and/or the vehicle body mounts,
    wherein
    c) the at least one multi-track floor conveyor vehicle is configured for omnidirectional travel such that the direction of conveyance can be selected independently of the orientation of the at least one multi-track floor conveyor vehicle and
    d) in the case of the at least one multi-track floor conveyor vehicle with the coupled vehicle body or vehicle body mount, a change in the direction of conveyance can be performed without a change in the relative orientation of vehicle body and/or vehicle body mount and the at least one multi-track floor conveyor vehicle.

2. The area storage according to claim 1, wherein the at least one multi-track floor conveyor vehicle and the vehicle body or the vehicle body mount are configured such that the vehicle body or the vehicle body mount can be travelled under by the at least one multi-track floor conveyor vehicle.

3. The area storage according to claim 1, wherein the vehicle body or the vehicle body mount can be travelled under from a first direction of conveyance and a second direction of conveyance, wherein the first direction of conveyance and the second direction of conveyance form an angle of at least 60°.

4. The area storage according to claim 3, wherein the angle is 90°.

5. The area storage according to claim 1, wherein the vehicle body mount comprises at least two support areas.

6. The area storage according to claim 5, wherein the at least two support areas are arranged and configured such that the at least one multi-track floor conveyor vehicle can travel between the at least two support areas to a stop position along a first direction of conveyance and can leave the stop position in a second direction of conveyance.

7. The area storage according to claim 1, wherein the vehicle body mounts are mounted stationarily on the storage area.

8. The area storage according to claim 1, wherein the vehicle body mounts can be moved by the at least one multi-track floor conveyor vehicle within the storage area.

9. The area storage according to claim 1, wherein the storage area can be relocated locally and/or divided by means of the at least one multi-track floor conveyor vehicle.

10. The area storage according to claim 1, wherein the portion of the storage area occupied by a storage place is determined by the size of the corresponding vehicle body and an additional function supplement portion.

11. The area storage according to claim 10, wherein the function supplement portion is variable.

12. The area storage according to claim 1, wherein the number of storage places per storage area can be varied locally or in total.

13. The area storage according to claim 1, wherein the area storage can be arranged between a body-in-white production process and a painting process, within the painting process and/or between the painting process and a final assembly process.

* * * * *